(12) United States Patent
Lecomte et al.

(10) Patent No.: US 8,229,117 B2
(45) Date of Patent: Jul. 24, 2012

(54) PROCESS AND SYSTEM FOR THE SECURE BROADCASTING OF PROTECTED AUDIOVISUAL STREAMS TO A DYNAMIC GROUP OF RECEIVERS

(75) Inventors: Daniel Lecomte, Paris (FR); Reda Hosny, Paris (FR)

(73) Assignee: Querell Data Limited Liability Company, Dover, DE (US)

( * ) Notice: Subject to any disclaimer, the term of this patent is extended or adjusted under 35 U.S.C. 154(b) by 1340 days.

(21) Appl. No.: 11/547,270

(22) PCT Filed: Apr. 6, 2005

(86) PCT No.: PCT/FR2005/000842
§ 371 (c)(1),
(2), (4) Date: Jul. 30, 2007

(87) PCT Pub. No.: WO2005/101836
PCT Pub. Date: Oct. 27, 2005

(65) Prior Publication Data
US 2011/0119699 A1    May 19, 2011

(30) Foreign Application Priority Data
Apr. 6, 2004 (FR) ..................................... 04 50682

(51) Int. Cl.
    H04N 7/167    (2011.01)
    H04K 1/10     (2006.01)
(52) U.S. Cl. .......................................... 380/239; 725/31
(58) Field of Classification Search .................. 380/239; 725/31
    See application file for complete search history.

(56) References Cited

U.S. PATENT DOCUMENTS

| 2003/0142826 | A1 | 7/2003 | Asano |
| 2003/0187801 | A1 | 10/2003 | Chase, Jr. et al. |
| 2005/0243924 | A1* | 11/2005 | Lecomte et al. ......... 375/240.16 |
| 2005/0289064 | A1* | 12/2005 | LeComte et al. ............... 705/51 |

FOREIGN PATENT DOCUMENTS

EP    1 248 433    10/2002
(Continued)

OTHER PUBLICATIONS

Philippe Chantepie, "Mesures Techniques de Protection des Oeuvres & DRMS," Online! Mar. 30, 2004, XP002338167.

(Continued)

*Primary Examiner* — Techane Gergiso
(74) *Attorney, Agent, or Firm* — Connolly Bove Lodge & Hutz LLP

(57) ABSTRACT

A process for the distribution of digital audiovisual sequences. An analysis is made prior to transmission to a dynamic group of receivers to generate a first modified main stream and complementary information. A synthesis of a stream in the original format is calculated on the receiver as a function of the modified main stream and the complementary information. Generation of the complementary information is constituted of the following steps: extraction of at least one original piece of data of the original stream, storage of the original data in the complementary information, formatting the complementary information in segments with each segment corresponding to at least one entire audiovisual element of the modified main stream, and encapsulation of at least one segment with at least one piece of access information in at least one data block to generate at least one access ticket for the corresponding audiovisual elements.

24 Claims, 2 Drawing Sheets

Construction of the access tickets

FOREIGN PATENT DOCUMENTS

| | | |
|---|---|---|
| WO | WO 98/42098 A1 | 9/1998 |
| WO | WO 01/97520 | 12/2001 |
| WO | WO-01/97520 | 12/2001 |
| WO | WO 02/23315 | 3/2002 |
| WO | WO-02/23315 | 3/2002 |
| WO | WO 02/062054 | 8/2002 |

OTHER PUBLICATIONS

An Office Action issued in related European Application No. 05 753 604.7 on Feb. 28, 2012, along with an informal translation.

Chinese Office Action issued in corresponding Chinese application with English language translation, Oct. 10, 2008.

* cited by examiner

PROCESS AND SYSTEM FOR THE SECURE BROADCASTING OF PROTECTED AUDIOVISUAL STREAMS TO A DYNAMIC GROUP OF RECEIVERS

RELATED APPLICATION

This is a §371 of International Application No. PCT/FR2005/000842, with an international filing date of Apr. 6, 2005 (WO 2005/101836 A1, published Oct. 27, 2005), which is based on French Patent Application No. 04/50682, filed Apr. 6, 2004.

TECHNICAL FIELD

The invention relates to the area of the secure distribution of digital audiovisual sequences to a dynamic group of receivers.

BACKGROUND

It is currently possible to transmit audiovisual programs in digital form via all types of broadcasting networks. To avoid the pirating of works broadcast in this manner, the latter are frequently encrypted or scrambled by various well known means.

US 2003/142286 relates to the area of the broadcasting of protected contents by encryption and presents a process for the revocation of receivers within a group. It describes a method of encryption during broadcasting including assignment of a main key to each of the receivers, each main key of which is used to derive two or a plurality of secondary keys. It centers on the management of the generation of secondary keys for the revocation. The revocation of the receiver is performed by indexing the secondary keys derived from the main key to be revoked. A secondary key is then selected that can be derived by the main keys of the authorized receivers, but not by that of the receiver to be revoked. Encryption of the content is performed by the secondary key selected and, thus, all the receivers have access to the content with the exception of the receiver whose main key had been revoked by the secondary key selected. That approach represents a classic encryption solution with the aid of keys and, as a consequence, the entire content remains in the protected stream. Moreover, the content is protected by the same secondary key for a multitude of receivers and, thus, if an ill-intentioned person finds the key and broadcasts it to other members of the group, the content would be accessible by all members of the group.

US 2003/187801 discloses a process for the protection of contents with the aid of encryption in combination with an architecture of the management of rights in which the digital content contains a license that can revoke a receiver. Changing the license for restitution of the content is performed by a modification code associated with the restitution license and coming from a license server. The apparatus of the receiver must have the modification code to have access to the license for restitution of the content and to modify it as a function of the modification code. The restitution license contains keys for decrypting the content and the encryption keys are generated with the aid of classic random functions. That approach represents an encryption solution with the aid of keys and, thus, the entire encrypted content remains in the protected stream. Moreover, such a generation of encryption keys renders the system vulnerable to attacks of the search correlation type between the keys generated for the protection of the content.

WO 98/42098A relates to the protection of a video stream by encryption of the complete stream, then extraction of certain fragments of the encrypted stream. The first stream, that is partial but encrypted, is sent to the subscribers in a free manner whereas the stream of encrypted fragments will be sent to a given user only after obtention of a license after identification. That approach performs an extraction of part of an encrypted stream to obtain to encrypted elements. It has the disadvantage that the first encrypted stream is incomplete and is no longer compatible with the format of the original stream. It can therefore not be viewed or heard by a standard reader (player) and can possibly no longer be transmitted or broadcasted by networks and standard servers.

Furthermore, the fragments extracted from the encrypted stream possibly do not permit the removal of audiovisual elements that would destroy the appearance for a human being. Thus, it is possible to see or hear a part of the audiovisual stream simply by decrypting the first encrypted stream.

WO 02/23315A relates to a system comprising: a first key for decrypting content, a header containing information for playing the content, a module for generating the first key, a module for encrypting the content and removing a first portion of the content and substituting the header for it.

The content can be encrypted with a single key or by segment, each segment being coded with a separate key. The key or keys are then backed up in a database server. During viewing of (listening to) content, the first portion of the content that had been removed is recombined with the decrypted file.

That approach poses the problem of classic content encryption systems with one or several keys, which encryption keys are recorded in a database server; the server is called by the client to recover the keys for decrypting the content at the moment of viewing (listening).

Even if that system is deemed to indicate that a part (the header) is substituted and retained in the server, this is not a substitution for the auto-protection of the content.

EP 1 248 433 discloses a separation of an audiovisual stream into two parts: an insufficient content and complementary content in such a manner as to be able to transmit less information when the user desires to see (listen to) the complete content. The insufficient content is broadcast beforehand or is sent during the broadcast.

That approach does not discuss encryption or protection of insufficient content and/or complementary content. The problem posed by that approach is that it is possible for any user to very easily recover the insufficient content and the complementary content and, therefore, to pirate the system.

Moreover, since the insufficient content is not viewable (audible), it is necessary that the complementary content has a relatively significant size (more than 10%) of the original content, which would have difficulty passing on narrowband networks. The insufficient content is no longer compatible with the format of the original content; the broadcasting and the transmission of the insufficient content can therefore not take place as simply.

SUMMARY

This invention relates to a process for distributing digital audiovisual sequences in accordance with an original stream format including a succession of frames containing original data including generating a modified main stream and complementary information of any format from the original stream, wherein generating the complementary information includes extracting and substituting at least one original piece of data of the original stream, storing the original data in the complementary information, formatting the complementary information and segments with each segment corresponding to at least one entire audiovisual element of the modified main stream, and encapsulating at least one segment with at least one piece of access information in at least one data block to generate at least one access ticket for corresponding audiovisual elements; transmitting the modified main stream and the complementary information to receiver equipment, and recomposing the modified main stream and the complementary information into the original stream format.

This invention also relates to a system for distribution of digital audiovisual sequences to a dynamic group of receivers, including an analysis module for generating a first modified main stream and complementary information of any format, at least one module for formatting the complementary information, at least one module for encapsulation in access tickets from the complementary information, at least one telecommunication network, and at least one synthesizing module in the receivers for recomposition of the original stream from the modified main stream and the access tickets.

BRIEF DESCRIPTION OF THE DRAWINGS

This invention will be better understood from a reading of the description of a following non-limiting representative example referring to the attach drawings in which.

DETAILED DESCRIPTION

Figure 1:
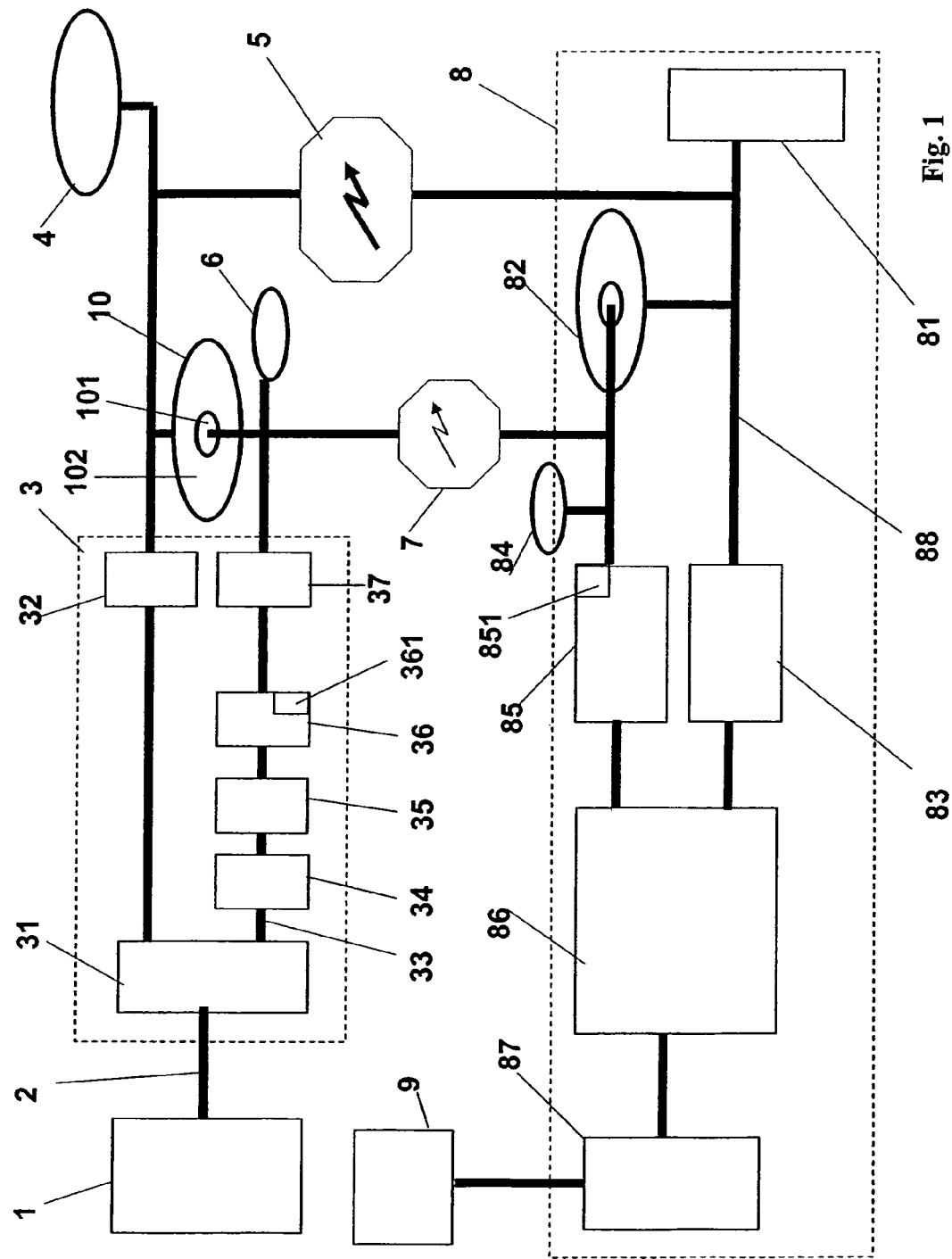
FIG. 1 describes the total architecture of a system for the implementation of the process.

We provide a process and a system that permit the visual and/or auditory protection of a audiovisual sequence stemming from a digital compression standard or a digital compression norm, the distribution in a very secure manner of the sequence to a dynamic group of receivers via a telecommunication network and reconstitution of its original content from a protected audiovisual stream on a recomposition module of the receiver equipment of each member of the dynamic group.

We more particularly provide a process and an apparatus capable of broadcasting in a secure manner via a telecommunication network or of distributing via a physical support a set of high-quality audiovisual streams to a viewing screen and/or to an audio output belonging to a terminal or to a display apparatus such as a television screen, a computer or even a mobile telephone, a mobile terminal of the PDA (Personal Digital Assistant) type or the like while preserving the audiovisual quality, but avoiding any fraudulent use such as the possibility of making pirated copies of the broadcasted digital contents.

The invention advantageously relates to a process and a client-server system in which the server is a module that applies a protection to the audiovisual contents and separates them into two parts, which second part is absolutely indispensable for the reconstitution of the original stream, and the client is a receiver capable of restoring the original content as a function of the recombination of this first part with this second part.

The process, in a preferred, but non-limiting example, separates the audiovisual flux into two parts in such a manner that the first part, called "modified main stream," contains a quasi-totality of the initial information, e.g., approximately 99%, and the second part, called "complementary information," contains the targeted elements extracted from the original information, that has a very small size relative to the first part.

In this invention, complementary information represents a low percentage (approximately 1%) of the original content. In addition, in this invention, the complementary information extracted from the original content is substituted by data of the same audiovisual type, but which thus auto-protects the content. The content auto-protected in this manner have a form identical to the form of the original stream.

The invention thus relates to a process and system for the secure distribution of protected audiovisual stream distributed in broadcast mode ("broadcast" in English) to a dynamic group of receivers. The term "dynamic group" denotes a broadcasting group that has the ability to accept or revoke receivers in a dynamic manner.

The broadcasting is advantageously made in multi-distribution "multicast" mode.

The distribution of contents is advantageously carried out via a standard physical support, e.g., a flash memory, CD-ROM, DVD or some other support.

The protection applied to the contents distributed by the secure system is advantageously based on the principle of deletion and replacement of certain information present in the original encoded audiovisual signal by any method, e.g.: substitution, modification, permutation or shifting of the information. Protection is also based on a knowledge of the structure of the digital stream. The solution includes extracting and permanently retaining in the complementary information part of the data of the audiovisual program recorded at the receiver or directly broadcast in a secure server connected to the broadcasting and transmitting network, which part is of prime importance for reconstituting the audiovisual program on a screen or an audio output of a terminal, but has a very small volume relative to the total volume of the digital audiovisual program recorded at the user's or received in real time by the user. The lacking part (the complementary information) will be transmitted via the secure broadcasting or transmitting network at the moment of the viewing of and/or listening to the audiovisual program.

The data removed from the original audiovisual program is advantageously substituted to form the modified main stream by random or calculated data called "decoys."

The original extracted data are advantageously not replaced by decoys.

The fact of having removed and substituted by decoys a part of the original data of the original audiovisual stream during generation of the modified main stream does not permit restitution of the original stream from only the data of the modified main stream.

The modified main stream may be entirely compatible with the format of the original stream and can, therefore, be copied and read by a reader, but it is completely incoherent form the viewpoint of visual and auditory human perception.

The modified main stream may have any format.

Once the digital stream has been separated into two parts, the largest part, the modified main stream, will then be transmitted via a classic broadcasting network whereas the lacking part, the complementary information, will be sent in broadcast mode (multicast-broadcast) via a narrowband telecommunication network such as the classic telephone networks or cellular networks of the GSM, GPRS, EDGE or UMTS type or by using a subset of the bandwidth shared on a cable network or also via a physical support such as a memory card or any other support. In one example, the two networks can be combined.

The audiovisual stream is reconstituted on the receiver equipment by a synthesizing module from the modified main stream and the complementary information, sent piece by piece during consumption of the audiovisual stream.

We disclose a process and system for the secure distribution of protected audiovisual streams distributed in broadcast mode, multicast or via a physical support, more precisely, the very secure distribution of the complementary information in broadcast mode, multicast or via a physical support permitting a dynamic management to be made of the rights of the receiver members of the dynamic broadcasting group.

The invention concerns in a general meaning a process for the distribution of digital audiovisual sequences in accordance with an original stream format constituted of a succession of frames containing original data, on which stream an analysis is made prior to transmission to the client equipment of a dynamic group of receivers to generate a first modified main stream and complementary information of any format, then the modified main stream and the complementary information are transmitted to the receiver equipment and for which a synthesis is calculated on the receiver equipment of a stream in the original format as a function of the modified main stream and the complementary information. This analysis for generation of complementary information is constituted by:
  a stage for extraction and substitution of at least one original piece of data of the original stream,
  a stage for storage of the original data in the complementary information,
  a stage for formatting the complementary information in segments with each segment corresponding to at least one entire audiovisual element of the modified main stream, and
  a stage for encapsulation of at least one segment with at least one piece of access information in at least one data block for generating at least one access ticket for the corresponding audiovisual elements.

Furthermore, each segment contains at least one piece of reconstruction information and at least one value of original data.

Likewise, the access tickets are broadcast in a mode without session to at least one dynamic group of receivers.

At least one access ticket is advantageously broadcast to all the receivers of the dynamic group in a secure manner by encryption.

The encryption of these access tickets may be carried out as a function of the content of these segments.

The access tickets may be sent by a path separate from the modified main stream. The access tickets may be sent by the same path as the modified main stream. The access tickets may be transported on a protected zone of a physical support.

An authorized receiver of this group advantageously processes at least one access ticket giving a segment of complementary information for the recomposition of an audiovisual element of the original stream.

These access tickets are advantageously decrypted with at least one group of keys. The group of keys is advantageously stored in a secure memory on the receiver side. The group of keys is advantageously different for at least two receivers of this group of receivers.

The access authorization for a receiver of the dynamic group to at least one part of the original audiovisual stream is preferably conditioned by the access tickets.

The invention also relates to a system for distribution of digital audiovisual sequences to a dynamic group of receivers for implementing the process, comprising an analysis module for generating a first modified main stream and complementary information in any format, at least one module for formatting the complementary information, at least one module for encapsulation in access tickets from the complementary information, at least one telecommunication network, and at least one synthesizing module in the receiver equipment for the recomposition of the original stream from this modified main stream and from these access tickets.

Turning now to the Drawings, FIG. 1 represents an implementation of the process based on the client-server principle, which client is a receiver and which server is an analysis module for fabrication of protected streams and units of complementary information and their broadcasting via the network.

Original audiovisual digital stream 1 to be secured is passed via link 2 to analysis and protection module 31 that generates modified main stream 32 in a format advantageously identical to the format of input stream 1 aside from the fact that certain original data were extracted and substituted by values different than the original ones, which modified main stream is stored on server 3. Complementary information 33 of any format contains the values of the original data and parameters relative to the characteristics of the modified, replaced, substituted or shifted data. The complementary information 33 is subsequently processed by formatting module 34, encapsulation module 35 and encryption module 36.

The operations of analysis and generation of the complementary information are performed with the aid of the following steps:
  extraction of the original data of the original stream by analysis and protection module 31,
  recording by analysis and protection module 31 of the original data and information relative to the original data in complementary information 33,
  formatting by formatting module 34 of complementary information 33 in segments, each segment of which corresponds to an entire audiovisual element of the modified main stream,
  encapsulation via encapsulation module 35 of the segments with the access information for generating access tickets for the corresponding audiovisual elements, and
  encryption of the access tickets in encryption module 36 for a set of keys for a group of receivers, which set of keys is generated in the key generation module 361.

The access tickets are advantageously not encrypted.

The complementary information processed by formatting module 34 is divided into a series of segments called "Unités d'Information Complementaire" or "Units of Complementary Information" (UIC). Each segment or UIC corresponds to a visual element coherent from the viewpoint of human visual perception, e.g., an image I or a group of images/group of pictures (GOP) and their associated audio packets. Each UIC is also divided into two fields: a first field $C_v$ that contains the original value of the element extracted from the original stream and a second field $C_r$ containing the position of the element extracted from the original stream and all other information for modification or relative to the characteristics of the extracted element necessary for reconstruction of the original stream.

The complementary information segmented in UIC's is then processed by encapsulation module 35 and a header is added to each UIC, thus forming an access ticket, which header comprises access information and information about rights for the receiver such as the number of possibilities for displaying the content, the geographical region that has rights for the broadcasting of the audiovisual element, the copyrights of the audiovisual element on other physical supports, the right to make a private copy, or other rights relative to the use of the audiovisual streams.

Each access ticket is then processed by encryption module 36, that encrypts it for a dynamic group of receivers in which new members can be admitted or revoked in a dynamic manner. The group has the ability to revoke a receiver at the moment of the fabrication of the access ticket encrypted for the group. The encryption module generates a set of keys 361 with which the parts $C_v$ and $C_r$ of the access tickets are encrypted for the group. A personal subset of keys is generated for each different receiver.

Figure 2:
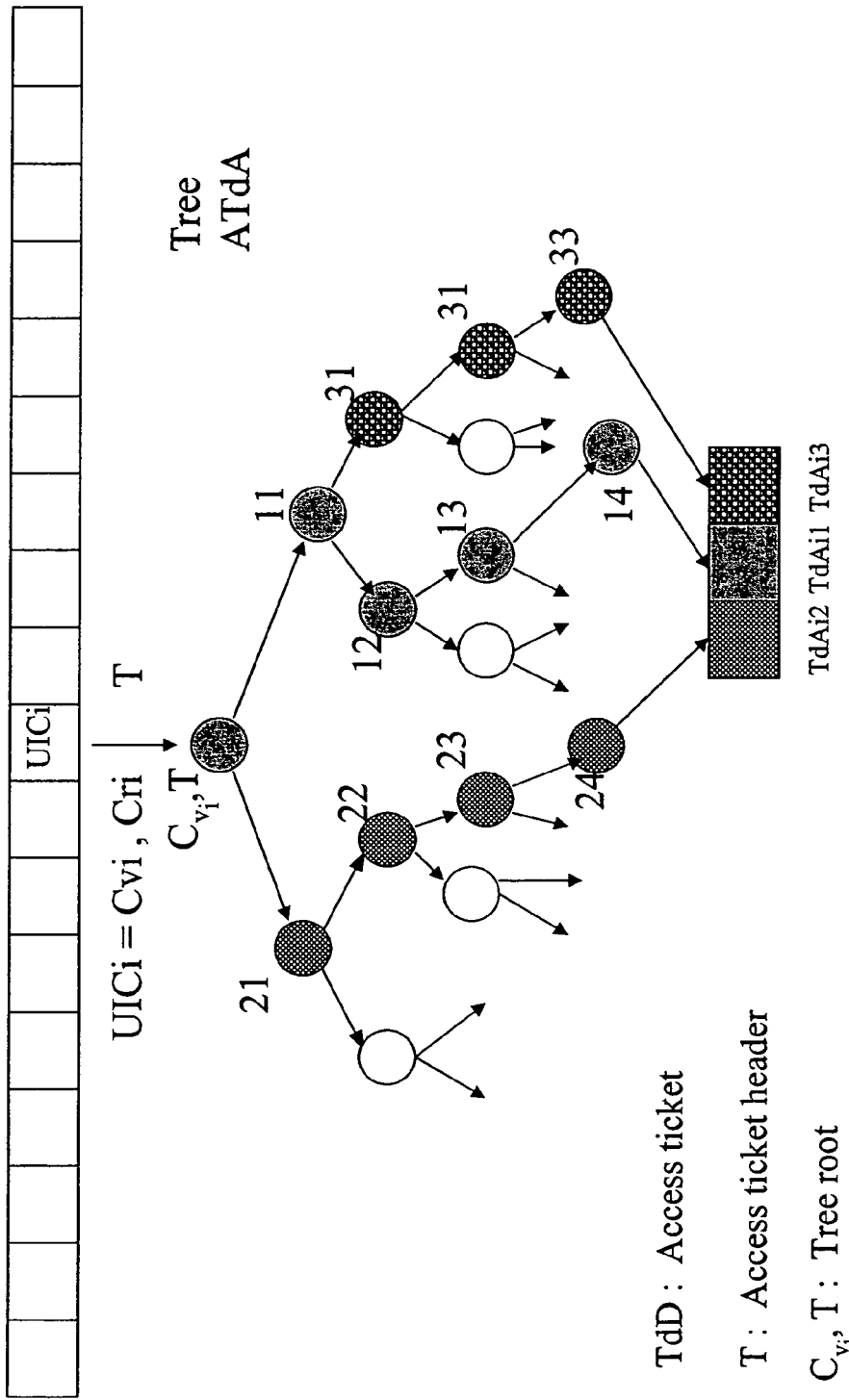
FIG. 2 represents a particular example that concerns the encryption algorithm in the construction of an information tree that contains nodes, pathways and sheets.
Figure 2:
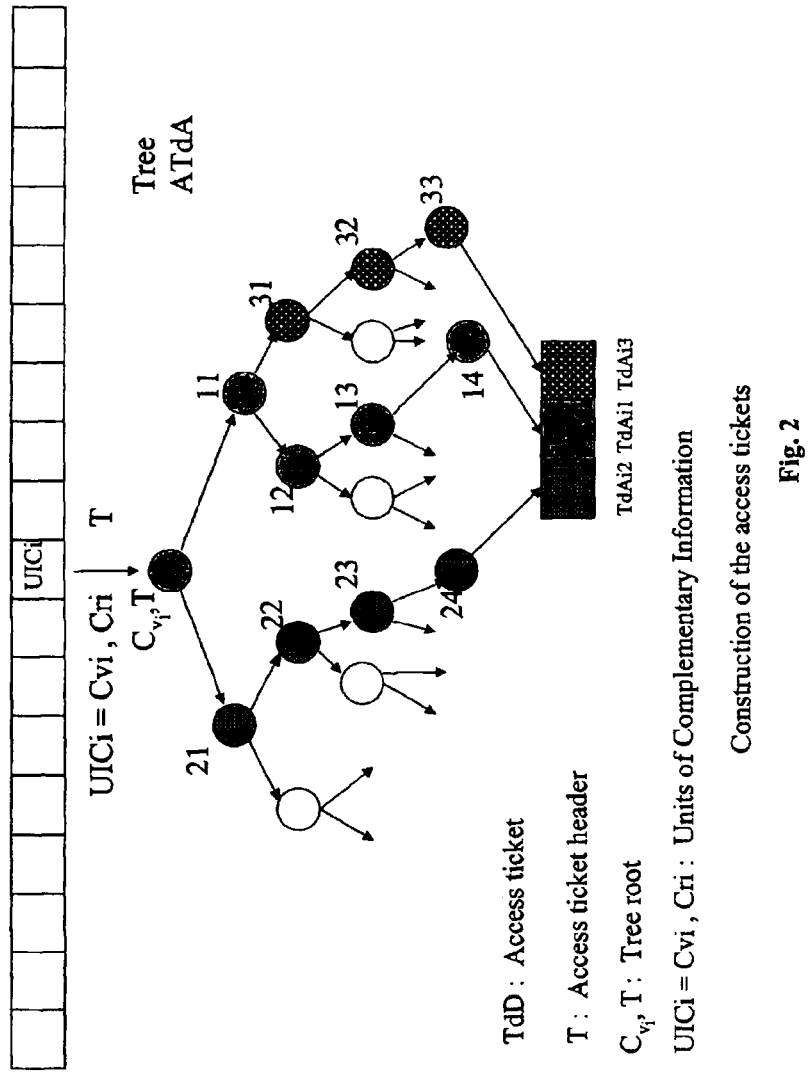

An example concerning the encryption algorithm is the construction of an information tree containing nodes, pathways and sheets and of which the root is the value of a chain of characters obtained by the concatenation of the values $C_{vi}$ and header T of the access ticket for each UIC as indicated in FIG. 2.

For example, for a first receiver, the root of the tree is encrypted with a first key $K_{11}$ and an initialization vector equal to $C_{r1}$ ($C_{r1}$ is the chain $C_{r1}, C_{r2}, \ldots, C_{rN}$ relative to N values $C_{vi}$ extracted from the original stream and stored in the UIC) and the node 11 is obtained. Then, the value of node 11 is encrypted with the aid of a second key $K_{12}$ and initialization vector $C_{r2}$ to construct node 12. This process is repeated until the obtention of sheet 14 representing the encrypted value of the access ticket. For a second receiver of the group, the path 11, 31, 32, 33 will be advantageously generated. The path 21, 22, 23, 24 will be advantageously generated for a third receiver of the group.

The elements encrypted by the algorithm described above are the original values $C_{vi}$ of the original stream. Extracted from the stream and therefore from their structured context, these values stored in the complementary information form a random set. As a result, the complementary information is a stream of random values, which reinforces the robustness of the protection against attacks by correlation analysis because there is no correlation between the values $C_{vi}$.

As shown in FIG. 1, the resulting complementary information 37 at the end of this processing is stored in server 3.

Modified main stream 32 is transmitted in broadcast or multicast mode via high throughput network 5 of the microwave, cable, satellite or other type to the terminal of receiver 8, preferably directly into reading buffer memory 83 of the receiver.

Modified main stream 32 is advantageously stored in memory 81, that is, e.g., a hard disk.

When receiver 8 makes a request to view the audiovisual sequence present in its memory 81, two eventualities are possible: in the first instance, receiver 8 does not have all the rights necessary for viewing the audiovisual stream and, in this instance, the modified main stream present in its memory 81 is passed to synthesizing module 86 via reading buffer memory 83, that does not modify it and transmits it identically to a reader capable of decoding it 87, and its content, previously degraded by scrambling module 31, is displayed on viewing screen 9.

In the second instance, server 3 decides that receiver 8 has the rights to view the audiovisual stream. In this instance, synthesizing module 86 makes a viewing request to sever 3 containing the complementary information in the form of access tickets 37 necessary for the recovery of original sequence 1. Server 3 then sends the complementary information in the form of access tickets 37 via telecommunication networks 7, permitting reconstitution of the original audiovisual stream in such a manner that receiver 8 can store it in buffer memory 85.

Network 7 can advantageously be of the same type as network 5.

Network 7 can be advantageously combined with network 5.

Upon reception in module 85 of the encrypted access tickets for a valid receiver, the valid receiver finds the value of $C_{vi}$ and of header T by passing via different intermediate nodes of the tree of the TdA ATdA (FIG. 2) that are attributed to it by virtue of its own subset of encryption keys stored in a secure manner in module 851. The personal subset of keys of this receiver is advantageously stored in a smart card or in a flash-type memory.

The value of $C_{ri}$ is used to reconstruct a part of the encryption tree by performing for the same access ticket the pathway and operations inverse to the encryption corresponding to each receiver, with the set of intermediate nodes being different for each valid receiver. The complementary information segments are decrypted with the aid of the key set and the values of $C_{ri}$, $C_{vi}$ and the header T containing the rights are reconstituted in real time for recomposition of the original stream. The access tickets are received and consumed continuously by the valid receptors of the group. A receptor is "valid" when its user has the rights to display the audio-visual stream clearly. A valid receiver can have access to the entire content of the audiovisual stream or to part of the audiovisual stream and its rights are notified, e.g., in header T.

The access tickets advantageously permit recomposition of a level with the quality or a resolution less than that of the original stream as a function of the rights of the valid receiver.

The set of access tickets corresponding to a modified main stream recorded on part 102 of a DVD 10 are advantageously recorded on the non-modifiable part 101 of support 10 of the Lead-In Area type and are transmitted to module 85 via DVD reader 82.

Synthesizing module 86 then proceeds to recompose the original audiovisual stream from the modified main stream that it reads in its reading buffer memory 83 and from the access tickets read in buffer memory 85 that permit it to recognize positions $C_r$ as well as the original values $C_v$ of the modified data. The audiovisual stream reconstituted in the original format is sent to reader-decoder 87 corresponding to this format. The reconstituted original audiovisual stream is then displayed on viewing screen 9 of receiver 8.

Modified main stream 32 is advantageously passed directly via network 5 to reading buffer memory 83 then to synthesizing module 86.

Modified main stream 32 is advantageously recorded on a physical support such as a CD-ROM-type disk, hard disk, flash memory cart 4. The modified main stream is then read from physical support 4 by disk reader 82 of box 8 to be transmitted to reading buffer memory 83, then to synthesizing module 86.

The modified main stream is advantageously recorded on a re-recordable physical support such as a CD-ROM or DVD disk 10 that has a modifiable part 102 and a non-modifiable part 101 on which the access tickets are recorded. The modified main stream is then read from part 102 of physical support 10 by disk reader 82 of box 8 to be transmitted to reading buffer memory 83, then to synthesizing module 86, and the complementary information is then read from part 101 of physical support 10 by disk reader 82 of box 8 to be transmitted to reading buffer memory 85, 10 then to synthesizing module 86.

Complementary information 33 is advantageously recorded on a physical support 6 with the format of a credit card constituted of a smart card or a flash memory card. Card 6 is read by card reader 84 of the apparatus of receiver 8.

Apparatus 8 is advantageously an autonomous, portable and mobile system.

The invention claimed is:

1. A process for distributing digital audiovisual sequences in accordance with an original stream format comprising a succession of frames containing original data comprising:
    generating a modified main stream and complementary information of a format from the original stream, wherein generating the complementary information comprises: extracting and substituting at least one original piece of data of the original stream, storing the original data in the complementary information, formatting the complementary information into segments with each segment corresponding to at least one entire audiovisual element of the modified main stream, and encapsulating at least one segment with at least one piece of access information in at least one data block to generate at least one access ticket for corresponding audiovisual elements, wherein the at least one access ticket includes a header comprising the access information; and
    transmitting the modified main stream and the complementary information to receiver equipment, to enable recomposing the modified main stream and the complementary information into the original stream format at the receiver equipment;
    wherein the access tickets are encrypted with at least one group of keys, wherein the at least one group of keys is stored in a secure memory on a receiver side, wherein groups of keys are different for at least two different receivers of a group of receivers.

2. The process according to claim 1, wherein each segment contains at least one piece of reconstruction information and at least one value of original data.

3. The process according to claim 1, wherein the access tickets are broadcast in a mode without session to at least one dynamic group of receivers.

4. The process according to claim 1, wherein at least one access ticket is broadcast to all the receivers of a dynamic group in a secure manner by encryption.

5. The process according to claim 4, wherein encryption of the access tickets is carried out as a function of content of the segments.

6. The process according to claim 4, wherein encryption of the access tickets is personalized for at least one dynamic group of receivers.

7. The process according to claim 1, wherein the access tickets are sent by a path separate from the modified main stream.

8. The process according to claim 7, wherein the access tickets are transported on a protected zone of a physical support.

9. The process according to claim 1, wherein the access tickets are sent by the same path as the modified main stream.

10. The process according to claim 1, wherein an authorized receiver of a group processes at least one access ticket giving a segment of complementary information for recomposition of an audiovisual element of the original stream.

11. The process according to claim 1, wherein the access authorization for a receiver of a dynamic group to at least one part of the original stream is conditioned by the access tickets.

12. The process according to claim 1, wherein the header further comprises information about rights of at least one receiver.

13. A system for distribution of digital audiovisual sequences, comprising:
    an analysis module configured to generate a first modified main stream and complementary information of a format from an original stream corresponding to an audiovisual sequence, the original stream having an original stream format comprising a succession of frames containing original data, wherein generating the complementary information includes extracting and substituting at least one original piece of data of the original stream,
    at least one module configured to format the complementary information into segments, with respective segments corresponding to at least one entire audiovisual element of the modified main stream, and
    at least one module configured to encapsulate at least one segment with at least one piece of access information in at least one data block to generate at least one access ticket for corresponding audiovisual elements, wherein the at least one access ticket includes a header comprising the access information,
    wherein the system is configured to transmit the modified main stream and the complementary information to receiver equipment to enable the receiver equipment to recompose the modified main stream and the complementary information into the original stream format;
    wherein the encryption module is configured to encrypt at least one access ticket with at least one group of keys, wherein the at least one group of keys is stored in a secure memory on a receiver side, wherein groups of keys are different for at least two different receivers of a group of receivers.

14. The system according to claim 13, further comprising an encryption module configured to encrypt access tickets prior to transmission.

15. The system according to claim 14, wherein the encryption module is configured to encrypt at least one access ticket for a dynamic group of receivers.

16. The system according to claim 13, wherein the header further comprises information about rights of at least one receiver.

17. A method for receiving digital audiovisual sequences in accordance with an original stream format comprising a succession of frames containing original data comprising:
    receiving, from a server, a modified main stream and complementary information of a format, wherein the complementary information is generated by extracting and substituting at least one original piece of data of the original stream, storing the original data in the complementary information, formatting the complementary information into segments with each segment corresponding to at least one entire audiovisual element of the modified main stream, and encapsulating at least one segment with at least one piece of access information in at least one data block to generate at least one access ticket for corresponding audiovisual elements, wherein the at least one access ticket includes a header comprising the access information;
    recomposing the modified main stream and the complementary information into the original stream format; and
    displaying the recomposed original stream on display equipment,
    wherein the at least one access ticket is decrypted with at least one group of keys, wherein the at least one group of keys is stored in a secure memory on a receiver side, wherein groups of keys are different for at least two different receivers of a group of receivers.

18. The method according to claim 17, wherein at least one access ticket is encrypted, and wherein the method further comprises decrypting the at least one access ticket.

19. The method according to claim 18, wherein the at least one access ticket is encrypted for a dynamic group of receivers.

20. The method according to claim 17, wherein the header further comprises information about rights of at least one receiver.

21. A system for receiving digital audiovisual sequences in accordance with an original stream format comprising a succession of frames containing original data comprising:
- at least one interface with at least one communication network to enable the system to receive, from a server, a modified main stream and complementary information of any a format, wherein the complementary information is generated by extracting and substituting at least one original piece of data of the original stream, storing the original data in the complementary information, formatting the complementary information into segments with each segment corresponding to at least one entire audiovisual element of the modified main stream, and encapsulating at least one segment with at least one piece of access information in at least one data block to generate at least one access ticket for corresponding audiovisual elements, wherein the at least one access ticket includes a header comprising the access information;
- a synthesizing module configured to synthesize from the modified main stream and the complementary information a digital audiovisual sequence in the original stream format; and
- a reader configured to decode the digital audiovisual sequence for display; and
- a memory configured to store a group of encryption keys associated with the system and with which the at least one access ticket is encrypted, wherein groups of keys are different for at least two different receivers of the dynamic group of receivers.

22. The system according to claim 21, wherein the at least one access ticket is encrypted, and wherein the system further comprises a decryption module configured to decrypt the at least one access ticket.

23. The system according to claim 22, wherein the at least one access ticket is encrypted for a dynamic group of receivers.

24. The system according to claim 21, wherein the header further comprises information about rights of at least one receiver.

* * * * *

UNITED STATES PATENT AND TRADEMARK OFFICE
CERTIFICATE OF CORRECTION

PATENT NO. : 8,229,117 B2
APPLICATION NO. : 11/547270
DATED : July 24, 2012
INVENTOR(S) : Lecomte et al.

It is certified that error appears in the above-identified patent and that said Letters Patent is hereby corrected as shown below:

On the Title Page, in the Figure, above Tag "33" delete Tag "31" and insert -- 32 --, therefor. (See Attached)

Title Page 2, in Field (56), under "FOREIGN PATENT DOCUMENTS", in Column 1, Line 3, delete "WO    WO-01/97520    12/2001".

Title Page 2, in Field (56), under "FOREIGN PATENT DOCUMENTS", in Column 1, Line 5, delete "WO    WO-02/23315    3/2002".

In Fig. 2, Sheet 2 of 2, above Tag "33" delete Tag "31" and insert -- 32 --, therefor. (See Attached)

In Column 4, Line 54, delete "form" and insert -- from --, therefor.

In Column 8, Line 23, delete "audio-visual" and insert -- audiovisual --, therefor.

In Column 11, Line 13, in Claim 21, after "of" delete "any".

Signed and Sealed this
Eighth Day of January, 2013

David J. Kappos
*Director of the United States Patent and Trademark Office*

(12) United States Patent
Lecomte et al.

(10) Patent No.: US 8,229,117 B2
(45) Date of Patent: Jul. 24, 2012

(54) PROCESS AND SYSTEM FOR THE SECURE BROADCASTING OF PROTECTED AUDIOVISUAL STREAMS TO A DYNAMIC GROUP OF RECEIVERS

(75) Inventors: Daniel Lecomte, Paris (FR); Reda Hosny, Paris (FR)

(73) Assignee: Querell Data Limited Liability Company, Dover, DE (US)

( * ) Notice: Subject to any disclaimer, the term of this patent is extended or adjusted under 35 U.S.C. 154(b) by 1340 days.

(21) Appl. No.: 11/547,270

(22) PCT Filed: Apr. 6, 2005

(86) PCT No.: PCT/FR2005/000842
§ 371 (c)(1),
(2), (4) Date: Jul. 30, 2007

(87) PCT Pub. No.: WO2005/101836
PCT Pub. Date: Oct. 27, 2005

(65) Prior Publication Data
US 2011/0119699 A1   May 19, 2011

(30) Foreign Application Priority Data
Apr. 6, 2004  (FR) .................................... 04 50682

(51) Int. Cl.
  *H04N 7/167*  (2011.01)
  *H04K 1/10*   (2006.01)
(52) U.S. Cl. ........................................ 380/239; 725/31
(58) Field of Classification Search ............... 380/239; 725/31
See application file for complete search history.

(56) References Cited

U.S. PATENT DOCUMENTS

| | | | |
|---|---|---|---|
| 2003/0142826 A1 | 7/2003 | Asano | |
| 2003/0187801 A1 | 10/2003 | Chase, Jr. et al. | |
| 2005/0243924 A1* | 11/2005 | Lecomte et al. | 375/240.16 |
| 2005/0289064 A1* | 12/2005 | LeComte et al. | 705/51 |

FOREIGN PATENT DOCUMENTS

EP   1 248 433   10/2002
(Continued)

OTHER PUBLICATIONS

Philippe Chantepie, "Mesures Techniques de Protection des Oeuvres & DRMS," Online! Mar. 30, 2004, XP002338167.

(Continued)

*Primary Examiner* — Techane Gergiso
(74) *Attorney, Agent, or Firm* — Connolly Bove Lodge & Hutz LLP

(57) ABSTRACT

A process for the distribution of digital audiovisual sequences. An analysis is made prior to transmission to a dynamic group of receivers to generate a first modified main stream and complementary information. A synthesis of a stream in the original format is calculated on the receiver as a function of the modified main stream and the complementary information. Generation of the complementary information is constituted of the following steps: extraction of at least one original piece of data of the original stream, storage of the original data in the complementary information, formatting the complementary information in segments with each segment corresponding to at least one entire audiovisual element of the modified main stream, and encapsulation of at least one segment with at least one piece of access information in at least one data block to generate at least one access ticket for the corresponding audiovisual elements.

24 Claims, 2 Drawing Sheets

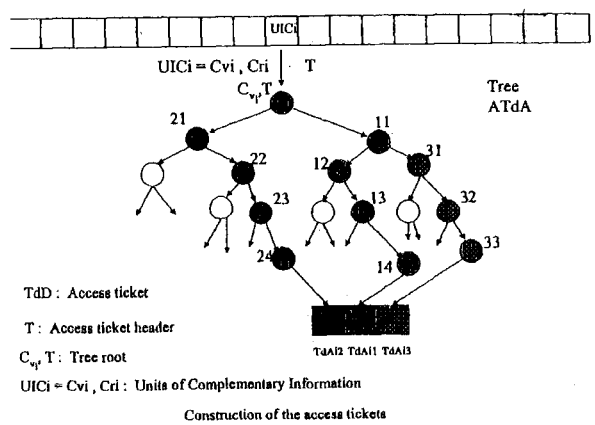

Construction of the access tickets